June 16, 1931.  G. JONES  1,810,711

STOVE

Filed Dec. 13, 1929

George Jones,
INVENTOR.

BY John M. Spellman
ATTORNEY.

Patented June 16, 1931

1,810,711

UNITED STATES PATENT OFFICE

GEORGE JONES, OF WAXAHACHIE, TEXAS

STOVE

Application filed December 13, 1929. Serial No. 413,807.

This invention has for its primary object to provide a simple and novel stove for cooking purposes and wherein there are arranged parts for cooking hamburgers and short orders.

Another particular object of the invention is to provide a stove of this character wherein there are arranged means for keeping articles of cooked food hot ready to be served. The new and improved stove is also constructed so that the parts thereof may be easily cleaned and kept in a sanitary condition.

The invention will be clearly understood from a perusal of the following detailed description, taken in connection with the accompanying drawings and wherein.

Proceeding in accordance with the drawings, the stove is preferably oblong in shape and has a rear wall 1, side walls 2 and front walls 3, these parts being constructed of any preferred metal such as sheet iron or the like. The stove body is supported upon legs 4, welded or affixed to the body in any preferred and practicable manner.

Figure 1:
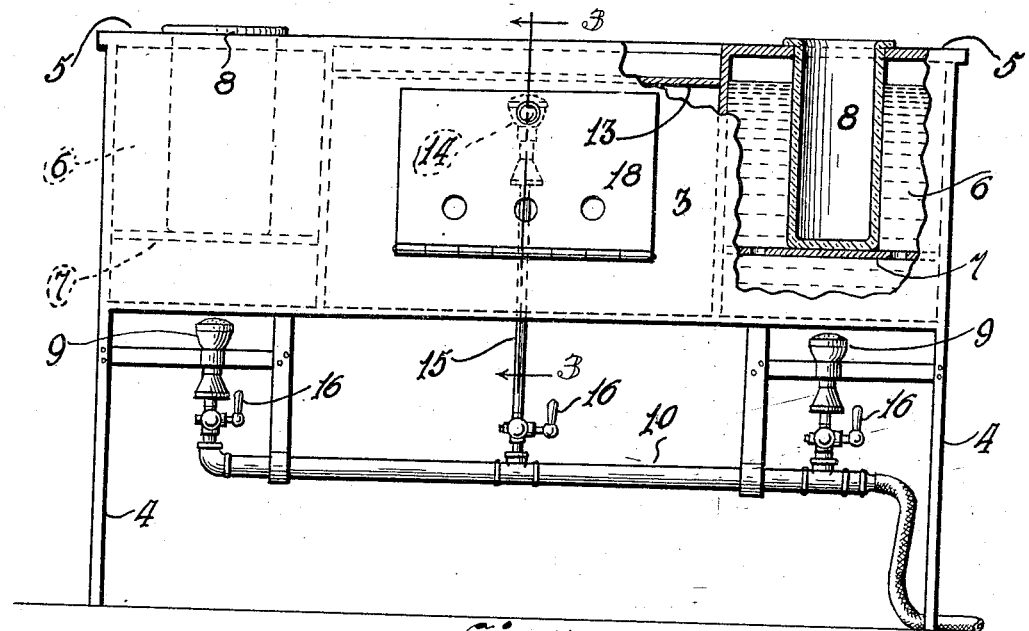
Figure 1 represents a front elevational view of the stove, certain parts being broken away and other parts shown in broken lines.
Figure 2:
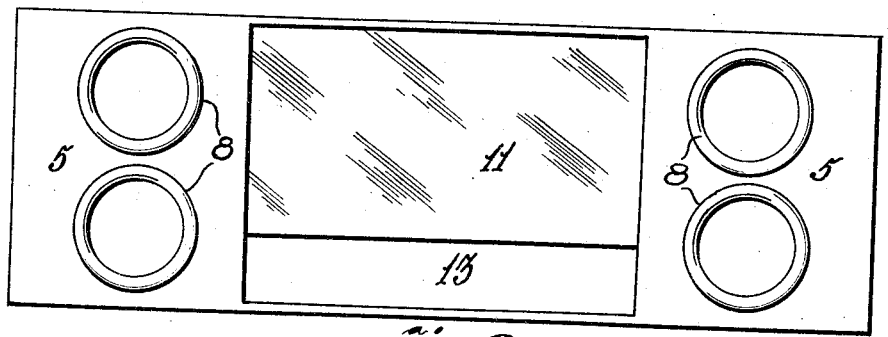
Figure 2 is a top plan view of the stove.
Figure 3:
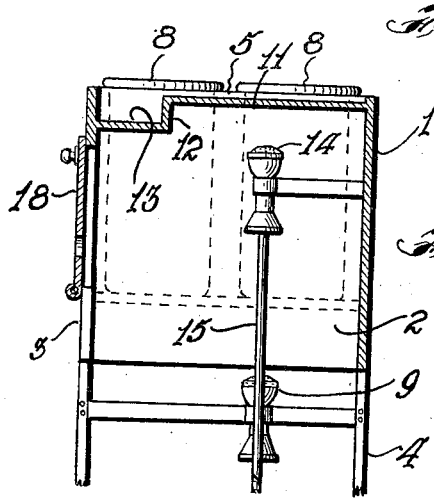
Figure 3 is a vertical sectional view taken along the line 3—3 of Figure 1.

The top 5 of the stove at the two ends has openings as will be apparent from Figure 1 and at each end are provided chambers 6 for water. In each of these chambers is a perforated support 7, spaced from the bottom of the chamber and upon which support are placed vessels 8, of sufficient depth to be immersed in the water for maintaining foods previously cooked, in a heated condition ready for serving. Or these vessels may be used for boiling or cooking such foods, heat for the water being supplied by the gas burners 9 at each end of the stove, as shown clearly in Figure 1, the burners being connected to the gas feed pipe 10. The water contained in each of the chambers 6 will come to a boil in approximately ten minutes, and afterwards the water can of course be kept hot by turning down the burner flame. Any foods placed in these vessels can thus be kept hot and palatable for serving immediately.

One of the principle objects aimed at in the invention is the provision for cooking hamburgers, hot dogs, eggs, and such short orders in the form of sandwiches. For this purpose and between the chambers 6 there is arranged a plate 11 and which plate is approximately as wide as the upper part of the stove. This plate is directed downward at the point 12 and forms a trough-like space formed by its bottom 13 and the adjacent parts and in this space other vessels are arranged containing foods of various sorts and cooking utensils, knives, spoons and the like, used in cooking the food. The plate 11 is sufficiently wide and long to enable several hamburgers, hot cakes, and the like to be cooked at one time, and gives ample room for the cooking operation in turning the articles while cooking. Immediately underneath this plate 11 is a burner 14, connected by pipe 15 to the main feed pipe 10, likewise each burner includes gas cocks 16. The front wall of the stove has a door 18 for access to the interior. The stove is compactly built, can be cleaned easily and kept in sanitary condition, and also may be manufactured at a nominal price.

While the disclosure represents a practical working embodiment of the invention there are alterations and modifications which may be made, such as will be within the scope and meaning of the appended claim.

What is claimed as new is:

A stove of the character described, having front and rear walls and an open top, said top comprising two end portions and a central frying plate, all arranged on substantially the same level, said end portions being provided with openings to permit admission of suitable vessels, water chambers beneath said end portions, said central plate having a downwardly offset portion at the forward end thereof forming with the front wall of the stove a readily available warming recess extending lengthwise of the stove for keeping warm articles of food and cooking utensils, and burners beneath said end chambers and said central plate.

In testimony whereof I affix my signature.

GEORGE JONES.